(12) United States Patent
Kass

(10) Patent No.: US 9,193,623 B2
(45) Date of Patent: Nov. 24, 2015

(54) SOLARIZATION-RESISTANT BOROSILICATE GLASS AND USE THEREOF FOR PRODUCTION OF GLASS TUBES AND LAMPS AND IN IRRADIATION UNITS

(71) Applicant: Schott AG, Mainz (DE)

(72) Inventor: Christof Kass, Tirschenreuth (DE)

(73) Assignee: SCHOTT AG, Mainz (DE)

( * ) Notice: Subject to any disclaimer, the term of this patent is extended or adjusted under 35 U.S.C. 154(b) by 51 days.

(21) Appl. No.: 14/063,058

(22) Filed: Oct. 25, 2013

(65) Prior Publication Data

US 2014/0117294 A1    May 1, 2014

(30) Foreign Application Priority Data

Oct. 26, 2012   (DE) .................. 10 2012 219 614

(51) Int. Cl.
```
C03C 4/08      (2006.01)
C03C 3/091     (2006.01)
C03C 3/093     (2006.01)
C03C 3/089     (2006.01)
F21V 3/04      (2006.01)
H01J 61/30     (2006.01)
H01K 1/28      (2006.01)
```
(52) U.S. Cl.
CPC ............. *C03C 4/085* (2013.01); *C03C 3/089* (2013.01); *C03C 3/091* (2013.01); *C03C 3/093* (2013.01); *F21V 3/04* (2013.01); *H01J 61/30* (2013.01); *H01J 61/302* (2013.01); *H01K 1/28* (2013.01)

(58) Field of Classification Search
CPC ........ C03C 3/089; C03C 3/091; C03C 3/093; C03C 4/085; F21V 3/04; H01K 1/28; H01J 61/30; H01J 61/302
See application file for complete search history.

(56) References Cited

U.S. PATENT DOCUMENTS

2004/0266603 A1 * 12/2004 Fechner et al. ................. 501/66
2005/0151116 A1 *  7/2005 Fechner et al. ............ 252/186.1

FOREIGN PATENT DOCUMENTS

DE    102008043317 A1    5/2010

* cited by examiner

*Primary Examiner* — Anthony J Green
*Assistant Examiner* — Elizabeth A Bolden
(74) *Attorney, Agent, or Firm* — Ohlandt, Greeley, Ruggiero & Perle, LLP

(57) ABSTRACT

A borosilicate glass is provided that has high solarization resistance and a defined position of the UV edge. The borosilicate glass includes the following constituents, in percent by weight based on oxide, of:
$SiO_2$ 65-85%;
$B_2O_3$ 7-20%;
$Al_2O_3$ 0-7%;
$Li_2O$ 0-2%;
$Na_2O$ 0-8%;
$K_2O$ 0-12%;
BaO 0-5%;
CaO 0-2%;
MgO 0-2%;
ZnO 0-2%;
$TiO_2$ 0.05-0.4%;
$MoO_3$ 0.025-0.3%; and
$V_2O_5$ 0.001-0.01%.

14 Claims, 3 Drawing Sheets

SOLARIZATION-RESISTANT BOROSILICATE GLASS AND USE THEREOF FOR PRODUCTION OF GLASS TUBES AND LAMPS AND IN IRRADIATION UNITS

CROSS REFERENCE TO RELATED APPLICATIONS

This application claims benefit under 35 U.S.C. §119(a) of German Patent Application No. 10 2012 219 614.5, filed Oct. 26, 2012, the entire contents of which are incorporated herein by reference.

BACKGROUND OF THE INVENTION

1. Field of the Invention

The invention provides a borosilicate glass having good solarization resistance, and for the use thereof for the production of glass tubes and the production of lamps, and for the use thereof in irradiation units, for example as top glass, a front pane or a shell tube. Solarization is understood to mean the decline in transparency for light of various wavelength ranges, which is caused by the action of short-wave ultraviolet (UV) radiation. In the broadest sense, the ultraviolet radiation range is understood to mean the wavelength range below that of visible light (about <380 namometers (nm)). In the narrower sense of this invention, the UV range is regarded as the wavelength range of about 100-330 nm.

2. Description of Related Art

Lamps, illuminants and irradiation units in general, which are exposed to ultraviolet radiation, require glasses with maximum solarization resistance. In order to be able to specify and establish the wavelength range and proportion of UV radiation transmitted and blocked, a defined position of the UV edge is also desired. The UV edge is understood to mean the transition in the transmission curve from the UV range of high transmission to the UV range of very low transmission down to the limit of transparency. Glasses of the type mentioned are required, for example, as top glass, or as a front pane or shell tube of irradiation devices, for example weathering systems. In such systems, for example, the ageing resistance of lacquers, pigments, materials, components and the like is studied. More particularly, they also serve to simulate the resistance of polymers to sunlight and to check the methods, guidelines or standards pertaining thereto.

In order to reduce any decline in transparency resulting from solarization effects during the use of glasses, it is known that glasses can be pre-aged by UV irradiation. However, this method is inconvenient and associated with corresponding costs, and leads to an unsatisfactory result for many applications, since the pre-aged glasses have a low transmission overall. There is therefore still a need for more solarization-resistant glasses.

The applicant supplies, for example, a borosilicate glass of the 8281 type for UV filters, which suppresses the transmission of particular UV components through its preset position of the UV edge, while visible light and near infrared is transmitted in high proportions. As an essential component which influences UV radiation, this glass receives blocking with molybdenum oxide $MoO_3$.

DE 10 2008 043 317 A likewise describes a glass wherein the UV blocking is established particularly by an $MoO_3$ content. To influence the transmission properties, especially in the short-wave range, additional assisting contents of $TiO_2$ and $Bi_2O_3$ are proposed.

For particular applications, however, the distribution of the short-wave light transmitted is unsuitable, or the solarization resistance is inadequate.

SUMMARY

The borosilicate glass proposed in accordance with the invention has the following contents (all the following figures relate to % by weight based on oxide): $SiO_2$ 65-85%, preferably 73-77%; $B_2O_3$ 7-20%, preferably 13.5-17.5%; $Al_2O_3$ 0-7%, preferably 1.3-3.3%; $Li_2O$ 0-2%; $Na_2O$ 0-8%; and $K_2O$ 0-12%.

Preferably, the sum total of alkali metal oxide present is 4.5-<6.5%.

In addition, the following components may be present in accordance with the invention: BaO 0-5%; CaO 0-2%; and MgO 0-2%.

The totality of the alkaline earth metal oxides is preferably 0-3%.

In addition, the following may be present: ZnO 0-2%, and refining agents in customary amounts, especially Cl⁻ 0-3% and/or F⁻ 0-0.6%.

According to the invention, a good solarization resistance is achieved, and the establishment of a defined position of the UV edge is possible, through a combination of the following three components: $TiO_2$ 0.05-0.4%; $MoO_3$ 0.025-0.3%; and $V_2O_5$ 0.001-0.01%.

Preference is given to a $TiO_2$ content of 0.1 to 0.3%, especially 0.2%.

The particularly preferred proportion of molybdenum oxide $MoO_3$ is 0.05 to 0.15%, especially 0.1%.

The particularly preferred content of $V_2O_5$ is 0.002 to 0.006%, especially 0.003%.

Preferably, the sum total of the alkali metal oxides in the components of the glass has a proportion of 5-6%, since this achieves a low coefficient of expansion, which promotes thermal cycling stability.

Further preferably, the alkali metal oxides used are solely $Na_2O$ and $K_2O$, and no $Li_2O$, since lithium is not just a comparatively costly component but also has a relatively strong tendency to migration and associated material changes.

The proportion of the alkaline earth metal oxides preferably totals 0.5-2%. This adjusts the transformation temperature such that low-stress fusibility is possible.

A particularly preferred refining agent is chlorine, the proportion of which is preferably 0.1-0.2%.

The inventive glass can be processed efficiently by the standard processes to give glass tubes, and is particularly suitable as a semi-finished product and for further processing to give lamp bulbs, shell tubes, but also for front panes and cover glasses.

For the profile of requirements specified, the following glass composition has been found to be particularly suitable: $SiO_2$ 75.35%; $B_2O_3$ 15.5%; $Al_2O_3$ 2.3%; $Na_2O$ 3.9%; $K_2O$ 1.5%; CaO 0.6%; MgO 0.4%; $TiO_2$ 0.2%; $MoO_3$ 0.1%; $V_2O_5$ 0.003%; and Cl⁻ 0.15%.

In the components for glass production, iron sometimes occurs as an impurity or accompanying substance. Since it is known that iron, or iron oxide in glasses, leads to solarization, glasses with low iron content are desired. Preferably, the $Fe_2O_3$ content is 20 parts per million (ppm), further preferably ≤10 ppm.

For applications in which irradiation with ultraviolet wavelengths is as far as possible to be avoided or suppressed, glasses with a steep UV edge are usually desired. Such glasses move comparatively rapidly from the state of high transmission values to a state of very low transmission values at relatively short wavelengths. For lamps, irradiation units, weathering systems and the like, in which, however, it is desirable that a particular proportion of ultraviolet radiation penetrates through the glasses, the aim, in contrast, is a gradual transition from the state of high transmission to the blocking region and hence a flatter profile of the UV edge.

For particular applications, there arise specifications according to which a transmission of 72% is to be achieved in the wavelength range of 319.5-327.5 nm. A transmission value of 38.5% is to be achieved at a wavelength between 301 and 305 nm and, finally, as a third reference or specification value, a transmission of 5% at a wavelength of 280-285 nm. In the diagrams which follow, these reference values are shown as filled circles and designated in the respective legends with Min and Max. In order that a transmission profile meets the demands, the transmission curve has to run between the pair of points for the respective minimum and maximum wavelength values.

DETAILED DESCRIPTION OF THE INVENTION

Figure 1:
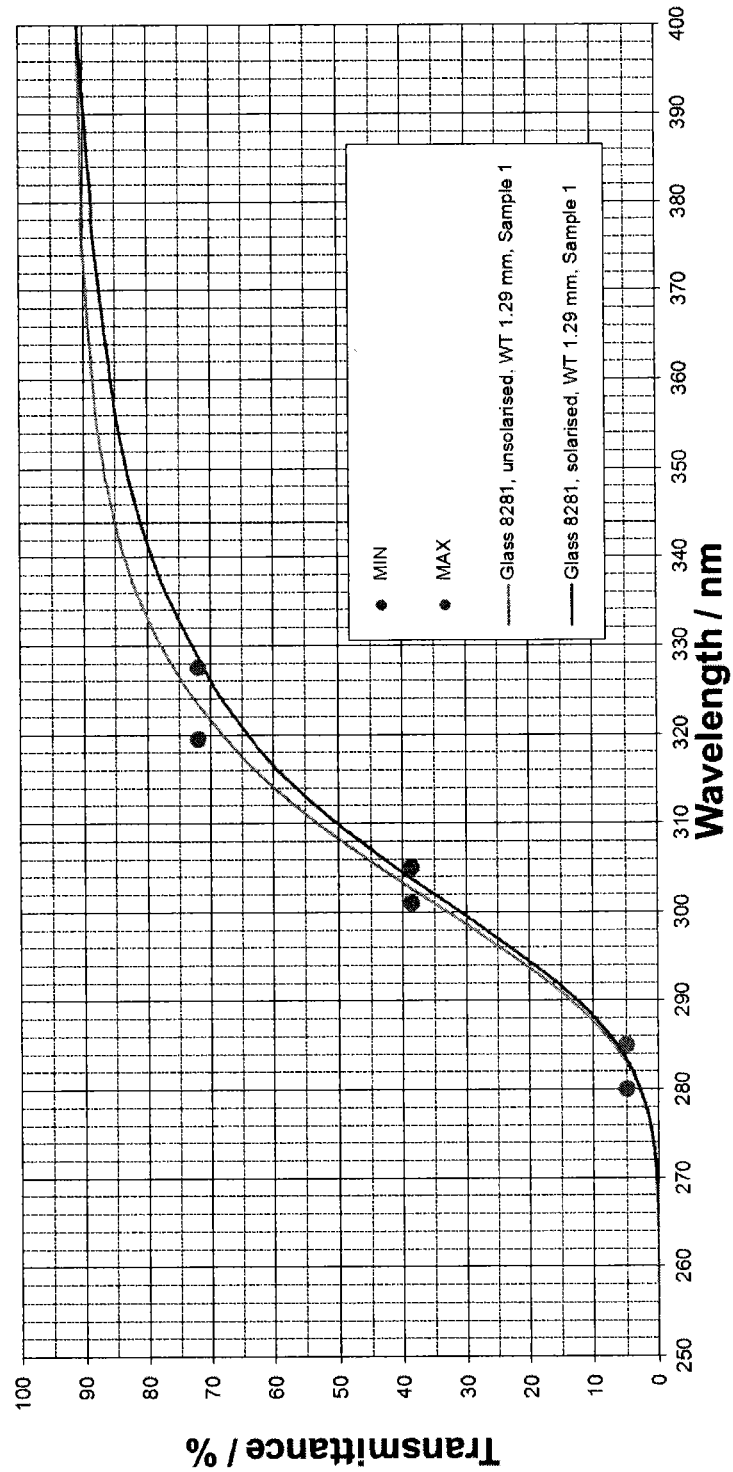
FIG. 1 is a transmission profile by transmittance percent plotted over the wavelength range from 250 to 400 nm for two glass samples.
Figure 2:
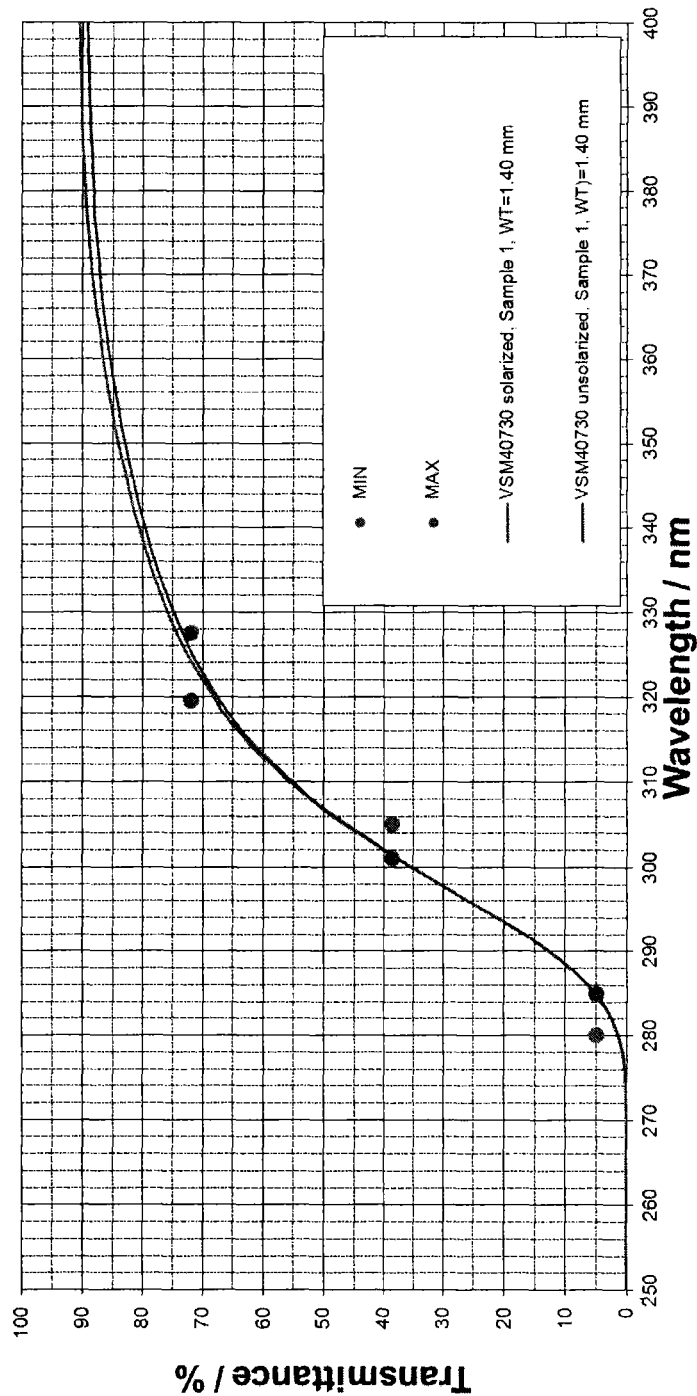
FIG. 2 is a transmission profile by transmittance percent plotted over the wavelength range from 250 to 400 nm for two additional glass samples.
Figure 3:
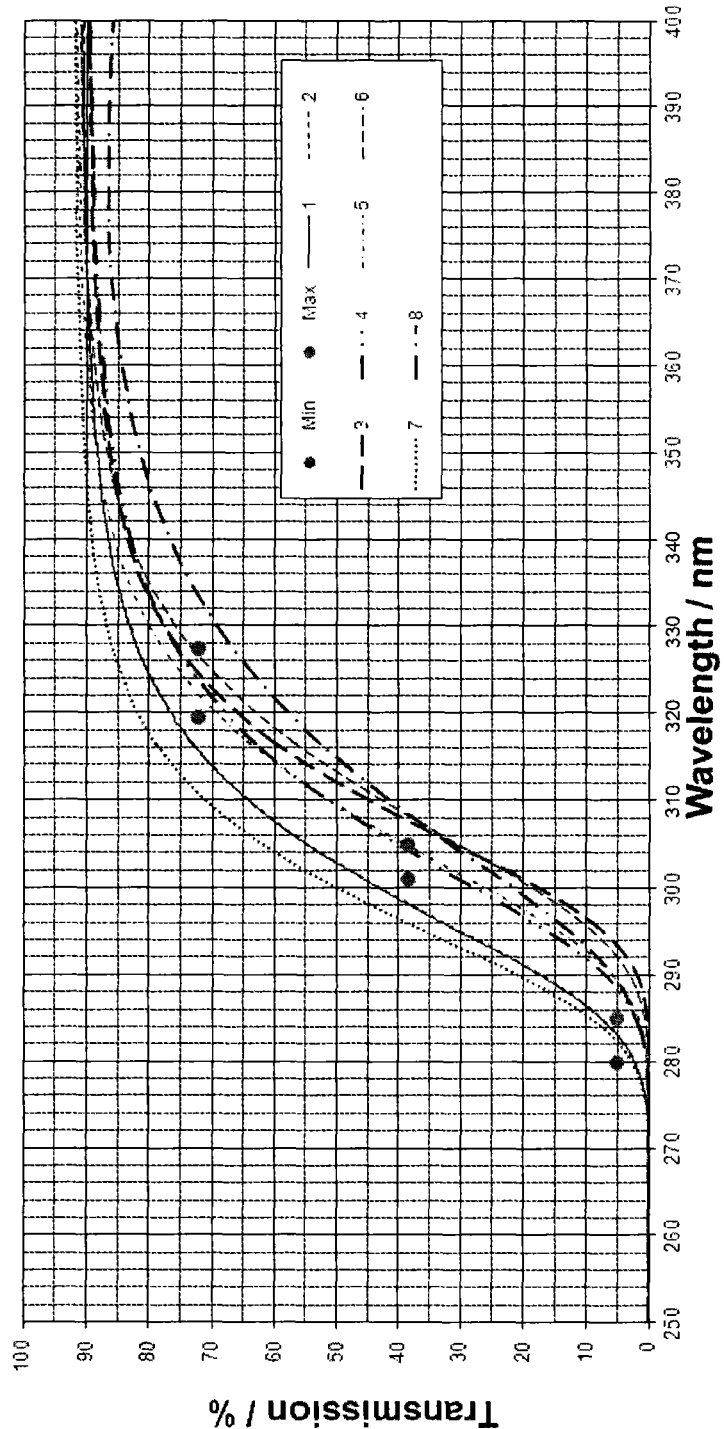
FIG. 3 is a transmission profile by transmittance percent plotted over the wavelength range from 250 to 400 nm for eight glass samples.

In FIGS. 1 to 3, for various glass samples, the profile of the transmission in percent was plotted over the wavelength range from 250 to 400 nm.

FIG. 1 shows the transmission profile of a glass sample according to the prior art (applicant's glass type 8281). The thickness of the glass sample was 1.29 mm. In the unirradiated state (the upper curve in FIG. 1), the transmission curve runs between the pairs of points for the target values, i.e. the specified transmission values are achieved at the desired wavelengths. The sample was irradiated with UV light from a UV radiator for a period of 15 hours. The UV radiator comprised a Philips HOK/4 lamp (HOK 4/120 high-pressure mercury lamp). The distance of the lamp from the sample was 7 cm. The principal emission of the lamp was at 365 nm; the irradiation intensity at 200-280 nm at distance 1 m was 850 μW/cm². The second curve shows the profile of the transmission curve after UV irradiation (the lower curve in FIG. 1). It is clearly evident that the curve, even after this relatively short irradiation period, moves out of the specified value range and has a flatter profile, and, more particularly, the transmission value of 72% is already achieved at greater wavelengths.

In comparison, in FIG. 2, the transmission curve for a glass sample having an inventive composition (according to claim 10) is plotted (the lower curve shows the transmission profile before solarization and the upper curve thereafter). The wall thickness of this glass sample was 1.40 mm and it was subjected to the same irradiation treatment as the sample in FIG. 1. It is apparent that the transmission profiles before and after UV radiation treatment run approximately identically or very close to one another over the entire wavelength range plotted. The inventive glass sample thus has only the very slightest degree of change, or barely any, in the transmission properties because of the UV irradiation, and the three specified transmission values are achieved within the desired wavelength ranges even after the UV irradiation.

The excellence of this property is illustrated by the comparative measurements described hereinafter. FIG. 3 shows the transmission profile of 8 different comparative samples, the thickness of which was between 1.25 mm and 1.41 mm in each case. All 8 samples are unirradiated, and it is apparent that all the samples even in the unirradiated state do not meet the specification values for the transmission values. The UV edges are either too steep or the transition from the high to the low transmission values is shifted to greater wavelength values compared to the desired profile. None of the 8 comparative examples meets all 3 specification values. Samples No. 1-8 have the same base glass composition as the glass sample shown in FIG. 2, but do not have the inventive combination of the oxides $TiO_2$, $MoO_3$ and $V_2O_5$. In comparative samples 1-8, various components which are known for their influence on UV transmission and solarization resistance were added individually and in different combinations. For comparison and completeness, a glass sample of the 8281 type, the transmission curve of which was shown in FIG. 1, is included in the last line of Table 1. As a blocking component, this glass contains only 0.25% molybdenum oxide, and no titanium dioxide, tin oxide or manganese oxide, nor any $MoO_3$ or $V_2O_5$.

TABLE 1

| (proportions in % by weight based on oxide) | | | | |
|---|---|---|---|---|
| Sample No. | $TiO_2$ | $MoO_3$ | $SnO_2$ | $MnO_2$ |
| 1 | 0.20 | 0.15 | — | — |
| 2 | 0.20 | 0.25 | — | — |
| 3 | 0.20 | — | 0.25 | — |
| 4 | 0.20 | — | — | 0.25 |
| 5 | 0.40 | 0.15 | — | — |
| 6 | 0.20 | 0.17 | 0.15 | — |
| 7 | 0.20 | 0.10 | 0.15 | — |
| 8 | 0.20 | 0.10 | 0.20 | — |
| 8281 glass | — | 0.25 | — | — |

It becomes clear from the comparison that a particularly advantageous solarization resistance and setting of the UV edge in the manner desired here is possible in the inventive base glass composition of a borosilicate glass and with a combination of the three components $TiO_2$, $MoO_3$ and $V_2O_5$ in the proportions stated.

What is claimed is:

1. A borosilicate glass having high solarization resistance and a defined position of a UV edge, comprising a composition, in % by weight based on oxide, of:
   $SiO_2$ 65-85%;
   $B_2O_3$ 7-20%;
   $Al_2O_3$ 0-7%;
   $Li_2O$ 0-2%;
   $Na_2O$ 0-8%;
   $K_2O$ 0-12%;
   BaO 0-5%;
   CaO 0-2%;
   MgO 0-2%;
   ZnO 0-2%;
   $TiO_2$ 0.05-0.4%;
   $MoO_3$ 0.025-0.3%; and
   $V_2O_5$ 0.001-0.01%.

2. The borosilicate glass according to claim 1, wherein the composition comprises:
   $SiO_2$ 73-77.5%;

B$_2$O$_3$ 13.5-17.5%;
Al$_2$O$_3$ 1.3-3.3%;
Σalkali metal oxides 4.5-<6.5%;
Σalkaline earth metal oxides 0-3%, and, as refining agents,
Cl$^{31}$ 0-0.3%; and
F$^-$ 0-0.6%.

3. The borosilicate glass according to claim 2, wherein the alkali metal oxide content is 5-6%.

4. The borosilicate glass according to claim 2, wherein the alkali metal oxide content is consists of Na$_2$O and K$_2$O.

5. The borosilicate glass according to claim 2, wherein the alkaline earth metal oxide content is 0.5-2.0%.

6. The borosilicate glass according to claim 2, wherein the refining agents further comprise chlorine and wherein the Cl$^-$ content is 0.1-0.2%.

7. The borosilicate glass according to claim 1, wherein the composition comprises 0.2% TiO$_2$.

8. The borosilicate glass according to claim 1, wherein the composition comprises 0.1% MoO$_3$.

9. The borosilicate glass according to claim 1, wherein the composition comprises 0.003% V$_2$O$_5$.

10. The borosilicate glass according to claim 1, wherein the composition comprises:
SiO$_2$ 75.35%;
B$_2$O$_3$ 15.5%;
Al$_2$O$_3$ 2.3%;
Na$_2$O 3.9%;
K$_2$O 1.5%;
CaO 0.6%;
MgO 0.4%;
TiO$_2$ 0.20%;
MoO$_3$ 0.1%;
V$_2$O$_5$ 0.003%; and
Cl$^-$ 0.15%.

11. The borosilicate glass according to claim 1, further comprising a transmission of 5% is present within the wavelength range from 280 to 285 nm, a transmission of 38.5% within the range from 301 to 304 nm, and a transmission of 72% within the range from 319.5 to 327.5 nm.

12. The borosilicate glass according to claim 1, wherein the borosilicate glass is suitable for production of glass tubes or for production of lamps.

13. The borosilicate glass according to claim 1, wherein the borosilicate glass is configured for use as top glass or a front pane or shell tube in irradiation units.

14. A borosilicate glass having high solarization resistance and a defined position of a UV edge, comprising a composition, in % by weight based on oxide, of:
SiO$_2$ 65-85%;
B$_2$O$_3$ 7-20%;
TiO$_2$ 0.05-0.4%;
MoO$_3$ 0.025-0.3%; and
V$_2$O$_5$ 0.001-0.01%, wherein the composition comprising a transmission of 5% within the wavelength range from 280 to 285 nm, a transmission of 38.5% within the range from 301 to 304 nm, and a transmission of 72% within the range from 319.5 to 327.5nm.

* * * * *